Patented Jan. 8, 1946

2,392,362

UNITED STATES PATENT OFFICE 2,392,362

PROCESS FOR MAKING MATERIAL FOR USE IN THE MANUFACTURE OF PROCESS CHEESE

Higbee Wayne Bryant, Stockton, Ill., assignor to Kraft Cheese Company, a corporation of Delaware No Drawing. Application April 28, 1943, Serial No. 484,858

5 Claims. (Cl. 99—116)

Process cheese, as that term is used herein, means a type of cheese usually in retail package form which, in the course of its manufacture, has been subjected to a temperature high enough to render the material fluid or plastic, so that it can be molded or caused to assume the shape of the interior of the container in which it is to be packaged and sold. An example of such processing operation is found in the United States Patent to James L. Kraft, No. 1,400,171.

The material used in the manufacture of process cheese has usually consisted largely of cheese in the usual form and unit sizes produced by the usual country cheese factory. These units, in general, have been subjected to the usual curing methods customary in the case of natural or unprocessed cheese, for the required length of time to develop the desired body, flavor and texture, the period of cure in most types of cheese being seldom less than thirty days and perhaps extending, in the case of some types of cheese, to as long as six months or a year. The expense of holding the cheese in the curing room for these periods plus the expense of treating or caring for the units of cheese while being cured, and the cost of handling, is considerable.

I have discovered that, in the manufacture of cheese of the class which consists of Limburger, brick, and Camembert and Roquefort, the curing of the cheese, i. e., the development of the required body, flavor and texture suitable for heat processing, can be effected by subjecting the curd or uncured cheese to proper conditions, in the form of relatively small chunks, for a relatively short time, for example a few days, thereby saving the expense of forming the curd, in the cheese factory, into units of the usual shape and size and without the necessity of subjecting such units to the usual curing treatment for a prolonged period of time.

General method

According to the general method which I have found successful in applying my discovery to the above-specified types of cheese, the milk, having first preferably been pasteurized, is treated in about the usual manner until the curd has been formed and cut. Then, after the temperature of the vat has been raised and maintained at an elevated temperature while the contents of the vat have been suitably agitated, the whey is drawn off, all practically in accordance with the usual practice followed with that type of cheese.

After the whey has been drawn off, the curd is pressed in the vat. After a sufficient length of time to insure thorough matting of the curd, the curd is cut up and sub-divided into small chunks having a thickness not materially more than one inch. Chunks in the form of three-quarter inch cubes appear to satisfy this size requirement very well.

The chunks of curd are then preferably washed with cold water or placed in a bath of cold water for a short time so as in effect to firm the curd and prevent further matting. The chunks are then placed in trays and subjected to the required treatment or conditions to develop properly the desired body, flavor and texture. Ordinarily it may be advisable, from time to time, to stir the material in the trays so as to insure that all of the chunks are properly exposed to the atmosphere while, at the same time, it is advisable to maintain such atmospheric conditions that the exterior surfaces of the chunks do not dry out or develop rind.

After the chunks have been held or treated for a sufficient length of time, the chunks are processed, i. e., consolidated or fused together by the use of heat, and the fused or plastic cheese is introduced directly into retail packages or shipping containers. The packaged cheese can be sold immediately and does not have to be stored or cured further to render it fit for immediate consumption.

Specific Example No. 1

In the case of Limburger type cheese, either raw pasteurized whole milk or milk standardized to a definite fat content may be used as the starting material. If unpasteurized milk is employed, it may not be necessary to add any lactic starter, whereas, if pasteurized milk is used, about one-half to one per cent of lactic acid starter is added to the vat. The temperature of the milk is raised to 86° to 90° F. after the usual quantity of rennet has been added, and it is held at that temperature of 86° to 90° F. until the curd has been set and has reached the required consistency for cutting. This ordinarily takes about twenty-five minutes.

The curd is cut into cubes of from one-quarter to one-half inch in size, and then the temperature is raised from 2° to 12° F., and agitation is immediately commenced. It is held at this temperature until the curd has reached a firm enough consistency, mechanical stirring being, of course, continued. This usually takes from one-half to one hour, at the end of which time enough whey is drawn off so that the level of liquid drops to a point where the curd begins to stick out.

Some Limburger cheese makers, at this point, add a five per cent brine solution in which the curd is soaked for ten or fifteen minutes. However, that is not necessary in the case of manufacturing Limburger type cheese by my method. In fact, at this point in my process, the procedure departs from that which is normally followed in the customary, old, Limburger cheese making method.

Having drained off most of the whey, the curds in the discharge end of the vat are distributed over the upper portion so as to concentrate the curd in a uniform layer in the upper two-thirds of the length of the vat and thereby obtain a somewhat thicker bed of curd than otherwise would be obtained. The curd is then covered with a series of heavy fine-mesh screens, made of wire or perforated metal, over which screens there is evenly distributed a weight of about one-thousand or fifteen-hundred pounds, figuring on the basis of the usual rectangular vat having a capacity of ten-thousand pounds of milk.

After the curd has been subjected to this pressure for about one-half an hour, it will be found to be thoroughly matted. It is then cut into strips about six inches wide, which may be further sub-divided into lengths of about a foot, and, as it is found that, under the conditions stated, the bed of matted curd is about six inches in depth or thickness, the cross section of the strip will be six inches by six inches. This is of a size to fit the mouth of a dicing machine which sub-divides the blocks of curd into three-quarter inch cubes. After dicing, the cubes are promptly put back into the vat where they are soaked in cold water (60° F.) for about ten to thirty minutes. This firms the chunks and prevents them from re-matting.

The cold water is then drained off the chunks of material, and then the chunks are salted in the vat by scattering or sprinkling thereon about three per cent of their weight of ordinary dry salt, sodium chloride. Preferably, this salt is added in three stages, and each salting is followed by a thorough forking in the vat so as to properly distribute the salt.

After the salting, the chunks are taken out of the vat and put into large trays which may be made of wood or stainless steel and of such size that the depth of material in the trays does not exceed about six inches. The trays containing the salted chunks are then moved into the curing room where they are left to stand over night. The curing room is maintained at a temperature of from 74° to 84° F., preferably between 76° and 82° F., and the humidity during the night time is kept at 100% (fog condition), and above 90% at other times.

In the morning, the chunks in the trays are analyzed for salt content and, if the salt is not quite up to 3%, enough salt is added, by sprinkling on the surface of the material in the trays, to bring the salt content up to at least 3%. After this further addition of salt, the contents of the trays are thoroughly forked.

There is then sprinkled onto the surface of the material in the trays a salt-water suspension of a pure culture of a lactose fermenting yeast, and the material in the trays is thoroughly forked to distribute the culture. Thereafter, the material is forked at least three times during the first day in the curing room.

At the beginning of the first full day in the curing room, the pH of the material after salting should be from 4.90 to 5.40.

After the yeast has been working on the material for about twenty-four hours, or rather less, add a pure culture of *Bacterium linens* in a salt-water suspension. This is sprinkled onto the material in the trays in the same manner as the yeast salt-water suspension. The material is then forked, and the forking is continued three times daily until the curing is completed.

Usually, it will be advisable, upon the third full day in the curing room, to sprinkle the material with a 15% salt solution. At this time, the pH of the material has risen to about 5.7, at which point the *Bacterium linens* culture commences to develop rapidly, and the yeast stops growing. After the material has been in the curing room for about a week, it has acquired the desired body, flavor and texture so that it can be processed by heat in the usual manner. The processing is carried on at a temperature of about 200° F. The material, after being processed, is found to possess all of the desirable characteristics of well-cured natural Limburger cheese.

*Specific Example No. 2*

In the case of brick type cheese, there is added to the pasteurized milk, in addition to the usual amount of lactic acid starter, about one-half to one per cent of a *Lactobacillus bulgaricus* culture, and the temperature of the vat is raised to from 86° to 90° F. After the curd has been set and cut, it is advisable to raise the temperature to about 90° to 102° F. in order to firm the curd and reduce the moisture as compared with the usual Brick type cheese making process. Before drawing the whey, the material is ripened until the acid has increased from .01 to .03%. The whey is then drawn, and the subsequent procedure is the same as in the case of my new Limburger type method, except that the *Bacterium linens* culture is not added, and the material is held in the curing room for about two or three days, at which time it is ready to proces. The material before processing contains about 40% to 42% moisture. The processing is done at a temperature of about 165° F.

*Specific Example No. 3*

In the manufacture of Camembert cheese for processing, the procedure followed is substantially the same as in the case of Limburger except that, instead of using a pure culture of *Bacterium linens*, or lactose fermenting yeast I use a pure culture of *Penicillium camemberti* and the material is kept in the curing room at a temperature of 68° F. to 75° F., and at a humidity of about 70 to 85%, until it is cured sufficiently for processing, which requires usually from one to two weeks from the time it enters the curing room.

The scope of the invention should be determined by reference to the appended claims.

I claim:

1. The improvement in manufacturing cheese of the class which consists of the Limburger, brick and Camembert varieties, which comprises forming and cutting the curd, draining off the whey, matting the curd, then subdividing the curd into chunks not materially more than one inch in thickness, promptly washing the chunks to prevent re-matting, subjecting the surfaces of the chunks to the action of aerobic organisms appropriate for ripening the particular variety of cheese desired, in a suitable atmosphere, so as to ripen the chunks individually during an interval of time so short that undesirable rind development is substantially prevented, and then promptly consolidating said ripened chunks by heat to form finished, cured cheese suitable for immediate sale and consumption.

2. The improvement in manufacturing cheese of the class which consists of the Limburger, brick and Camembert varieties, which comprises forming and cutting the curd, draining off the whey, matting the curd, then subdividing the curd into chunks not materially more than one inch in thickness, promptly washing the chunks to prevent re-matting, subjecting the surfaces of the chunks to the action of aerobic organisms appropriate for ripening the particular variety of cheese desired, in a suitable atmosphere, meanwhile stirring the chunks from time to time to insure uniform exposure of their surfaces to said atmosphere, so as to ripen the chunks individually during an interval of time so short that undesirable rind development is substantially prevented, and then promptly consolidating said ripened chunks by heat to form finished, cured cheese suitable for immediate sale and consumption.

3. The improvement in manufacturing Limburger cheese, which comprises forming and cutting the curd, draining off the whey, matting the curd, then sub-dividing the curd into chunks not materially greater in size than one-inch cubes, washing the chunks in cool water to prevent re-matting, salting the chunks, inoculating the chunks with *Bacterium linens*, exposing the chunks to an atmosphere having a humidity of not less than about 90% and a temperature of between 74° and 84° F. to ripen the chunks individually, while stirring the material from time to time to insure uniform exposure of the chunks to said atmosphere, and promptly consolidating said ripened chunks by heat to form finished cured cheese.

4. The improvement in manufacturing Limburger cheese, which comprises forming and cutting the curd, draining off the whey, subjecting the curd to pressure to mat the same, then sub-dividing the curd into chunks not materially greater in size than one-inch cubes, washing the chunks in cold water to prevent re-matting, salting the chunks, first inoculating the chunks with a lactose fermenting yeast and, after a suitable interval of time, inoculating the chunks with *Bacterium linens*, exposing the inoculated chunks to an atmosphere having a humidity of not less than about 90% and a temperature of between 74° and 84° F. to ripen the chunks individually, while stirring the material from time to time to insure uniform exposure of the chunks to said atmosphere, and promptly consolidating said ripened chunks by heat to form finished cured cheese.

5. The improvement in manufacturing process cheese of the brick type, which comprises forming and cutting the curd, draining off the whey, subjecting the curd to pressure to mat the same, then sub-dividing the curd into chunks not materially greater in size than one-inch cubes, washing the chunks in cold water to prevent re-matting, salting the chunks, inoculating the chunks with a lactose fermenting yeast, exposing the chunks to an atmosphere having a humidity of not less than about 90% and a temperature of between 74° and 84° F. to ripen the same, while stirring the material from time to time to insure uniform exposure of the chunks to said atmosphere, and processing said ripened chunks.

HIGBEE WAYNE BRYANT.